US009231842B2

(12) United States Patent
Cha (10) Patent No.: US 9,231,842 B2
(45) Date of Patent: Jan. 5, 2016

(54) METHOD FOR DYNAMIC NETWORK PATTERN ANALYSIS OF MOBILE APPLICATION, SYSTEM AND RECORDING MEDIUM THEREOF (71) Applicant: IDEAWARE INC., Seongnam-si, Gyeonggi-do (KR)

(72) Inventor: Yang Meong Cha, Seongnam-si (KR)

(73) Assignee: IDEAWARE INC., Seongnam-Si, Gyeonggi-do (KR)

( * ) Notice: Subject to any disclaimer, the term of this patent is extended or adjusted under 35 U.S.C. 154(b) by 135 days.

(21) Appl. No.: 14/347,576

(22) PCT Filed: Feb. 12, 2013

(86) PCT No.: PCT/KR2013/001058
§ 371 (c)(1),
(2) Date: Mar. 26, 2014

(87) PCT Pub. No.: WO2013/122360
PCT Pub. Date: Aug. 22, 2013

(65) Prior Publication Data
US 2014/0237117 A1 Aug. 21, 2014

(30) Foreign Application Priority Data

Feb. 13, 2012 (KR) .................. 10-2012-0014430

(51) Int. Cl.
H04L 12/26 (2006.01)
H04W 24/08 (2009.01)
H04L 12/24 (2006.01)
H04W 52/02 (2009.01)
H04W 88/02 (2009.01)
H04W 28/06 (2009.01)

(52) U.S. Cl.
CPC ............ *H04L 43/0876* (2013.01); *H04L 41/14* (2013.01); *H04W 24/08* (2013.01); *H04W 52/0209* (2013.01); *H04W 52/0229* (2013.01); *H04W 88/02* (2013.01); *H04W 28/06* (2013.01)

(58) Field of Classification Search
USPC .......................... 709/224, 228, 225
See application file for complete search history.

(56) References Cited

U.S. PATENT DOCUMENTS

| 2006/0046689 | A1* | 3/2006 | Kim | H04W 12/06 455/406 |
| 2014/0237117 | A1* | 8/2014 | Cha | H04L 41/14 709/224 |
| 2014/0241155 | A1* | 8/2014 | Cha | H04W 28/08 370/230 |
| 2014/0241156 | A1* | 8/2014 | Cha | H04L 43/0876 370/230 |
| 2015/0009825 | A1* | 1/2015 | Cha | H04L 47/20 370/235 |
| 2015/0049607 | A1* | 2/2015 | Cha | H04L 47/20 370/230 |

FOREIGN PATENT DOCUMENTS

| KR | 10-2005-0061902 A | 6/2005 |
| KR | 10-0882354 B1 | 2/2009 |
| KR | 10-1107094 B1 | 1/2012 |

* cited by examiner

*Primary Examiner* — Jude Jean Gilles
(74) *Attorney, Agent, or Firm* — Novick, Kim & Lee, PLLC; Sang Ho Lee (57) ABSTRACT

The present invention relates to a method for dynamic network pattern analysis of a mobile application, a system thereof, and a recording medium thereof. The system for dynamic network pattern analysis of a mobile application, comprising: a manage unit for managing a detecting application included in a wireless terminal device, the detecting application detecting network usage information of one or more analysis target applications; a reception unit for receiving the network usage information of the analysis target application included in the wireless terminal device through the detection application; a storage unit for accumulatively storing the network usage information received by the reception unit, in connection with information of the analysis target application, in a storage medium; and an analysis unit for obtaining network usage pattern information of the analysis target application by analyzing the network usage information accumulatively stored in the storage medium.

20 Claims, 7 Drawing Sheets

METHOD FOR DYNAMIC NETWORK PATTERN ANALYSIS OF MOBILE APPLICATION, SYSTEM AND RECORDING MEDIUM THEREOF

BACKGROUND OF THE INVENTION

1. Technical Field

The present invention relates to obtaining network usage pattern information, after analyzing network usage information of analysis target applications included in the wireless terminal device, for reducing wireless network load.

2. Description of the Related Art

After smart phones are introduced to the public, using patterns of terminal devices by individual users are rapidly moving from voice-call-oriented use to data-communication-oriented use.

Figure 1:
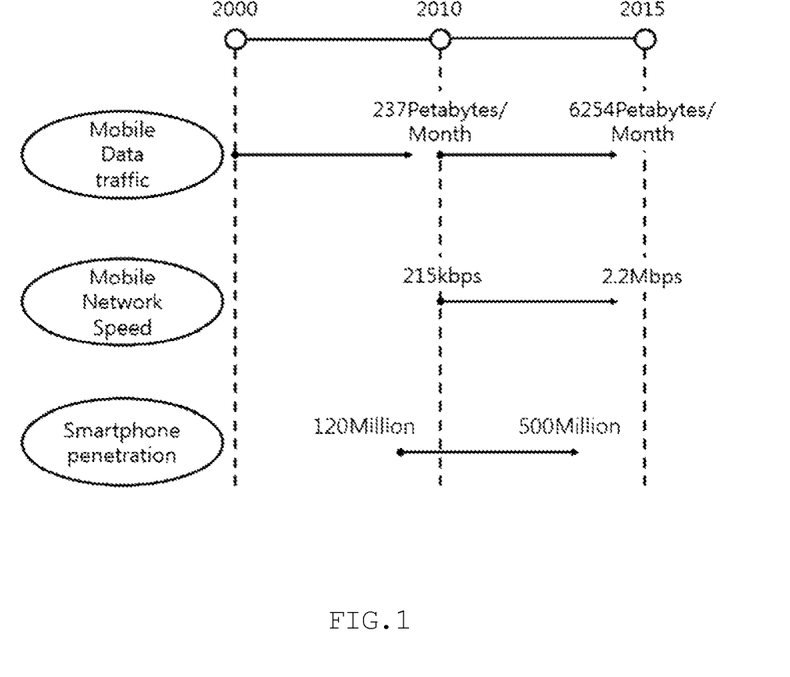
FIG. 1 shows a view illustrating a mobile (wireless) data traffic indexes.

As mobile (wireless) data traffic indexes in FIG. 1 show, mobile traffic is expected to continuously increase up to 26 times for the next 10 to 15 years. In the year 2010, an individual user daily used around 15 MB of mobile data, which may reach 1 GB in the year 2020.

Such increase in mobile traffic directly affects profitability and service quality of mobile carriers, forcing them to install additional equipment, consequently reducing their profits. Service dissatisfactions of mobile network users are also increasing, because of slowed speed of data communication.

Accordingly, in order to reduce investment burden and to ensure service quality, the mobile carriers are facing a challenge to make more efficient use of network infra, and need alternatives which provide predictability and real-time controllability, overcoming the limitations of conventional technology.

Figure 2:
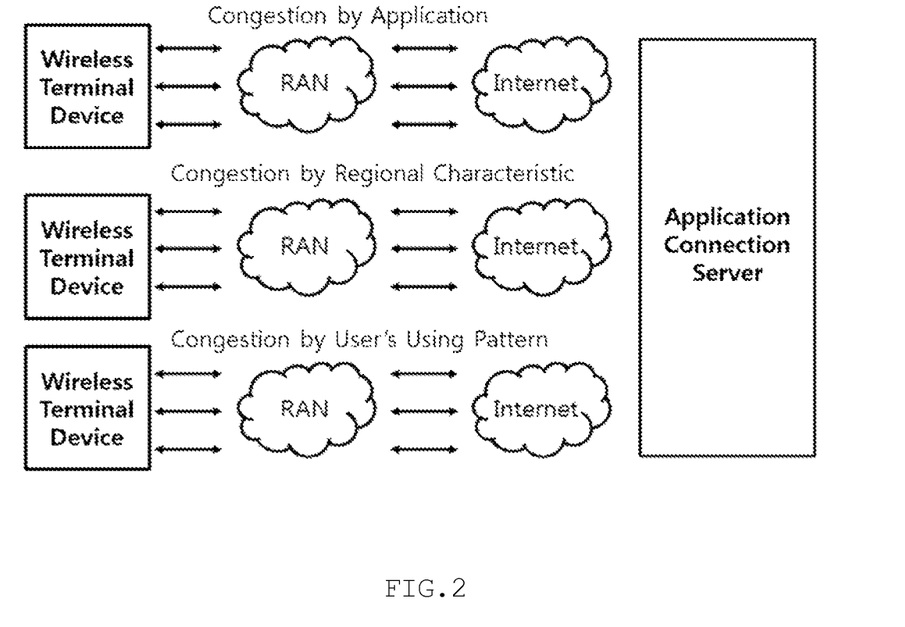
FIG. 2 shows a view illustrating main factors causing network congestions of the conventional technology.

Meanwhile, as FIG. 2 shows, mobile network congestions are mainly caused by unnecessary use of network by the applications installed in wireless terminal devices, numerous wireless terminal devices concentrated in a limited space (e.g. stadium, subway, etc.), and using patterns of users.

In conclusion, in order to solve out both the mobile carriers' enormous waste of cost and the individual users' service dissatisfaction, alternatives capable of controlling the network using patterns have become absolutely needed. But unfortunately, solutions for these problems have not been introduced so far.

The above-mentioned problems in conventional technology and the awareness on the challenge are not obviously known for the persons who skilled in the art of the present invention. Therefore, the present invention shall not be deemed to be obvious based on this awareness.

SUMMARY OF THE INVENTION

An object of the present invention for solving the above-mentioned problems is providing a method, a system and a recording medium for receiving network usage information of an analysis target application included in a wireless terminal device by using a detection application included in the wireless terminal device, the detection application detecting the network usage information of the one or more analysis target applications, after accumulatively storing the received network usage information in connection with the analysis target application information in a storage medium, obtaining network usage pattern information of the analysis target application by analyzing the network usage information of each analysis target application accumulatively stored in the storage medium, and eventually enabling an optimized usage method control based on a policy at the wireless terminal device side using the obtained network usage pattern information. With this, the mobile carriers may be able to reduce the installation cost of additional equipment and improve the service quality. At the same time, the user's data communication environment may be also improved by resolving the network congestions, with reduced consumption of batteries. In addition, the application developers and mobile carriers may operate reasonable discussion channels for each other.

Technical tasks to achieve in the present invention are not limited to the above-mentioned technical tasks. Other technical tasks which are not mentioned may be clearly understandable for those who skilled in the art of the present invention from the following description.

According to an aspect of the present invention, by obtaining the network usage pattern information of each analysis target application included in the wireless terminal device, it may be possible to block or control unnecessary executions of applications which may cause network load by the policy. With this, it may also be possible to use the network optimally at the wireless terminal device side.

According to another aspect of the present invention, by optimizing network usage, the mobile carriers may be able to minimalize the installation cost of additional equipment.

According to another aspect of the present invention, by optimizing network usage, it may be possible to minimalize wireless terminal device user's dissatisfaction caused by data communication delay, etc. Additionally, battery consumption of the wireless terminal device may be reduced dramatically.

According to another aspect of the present invention, through network usage pattern information for each of the applications, application developers and mobile carriers may discuss easily in order to reduce network load.

DESCRIPTION OF THE PREFERRED EMBODIMENTS

Hereinafter, referring to enclosed figures and descriptions, operation principles of preferred embodiments of the present invention will be described. However, figures illustrated and descriptions mentioned in the below are only for the preferred embodiments among various method of describing features of the present invention. Therefore, the present invention is not limited to the figures illustrated and descriptions mentioned in the below. Additionally, in case of determining that a detailed description about known function or structure relating to the present invention may evade the main point of the present invention, the detailed description may be omitted. Also, terms to be mentioned in the following are defined in consideration of functions in the present invention, which may be vary according to the intention of a user or an operator, practical customs, etc. Therefore, the definition of the terms shall be made based on the overall contents of the present invention.

In conclusion, the technical spirit of the present invention shall be decided by claims. The following embodiments are merely a means for describing progressive spirit of the present invention to persons who skilled in the art of the present invention.

Figure 3:
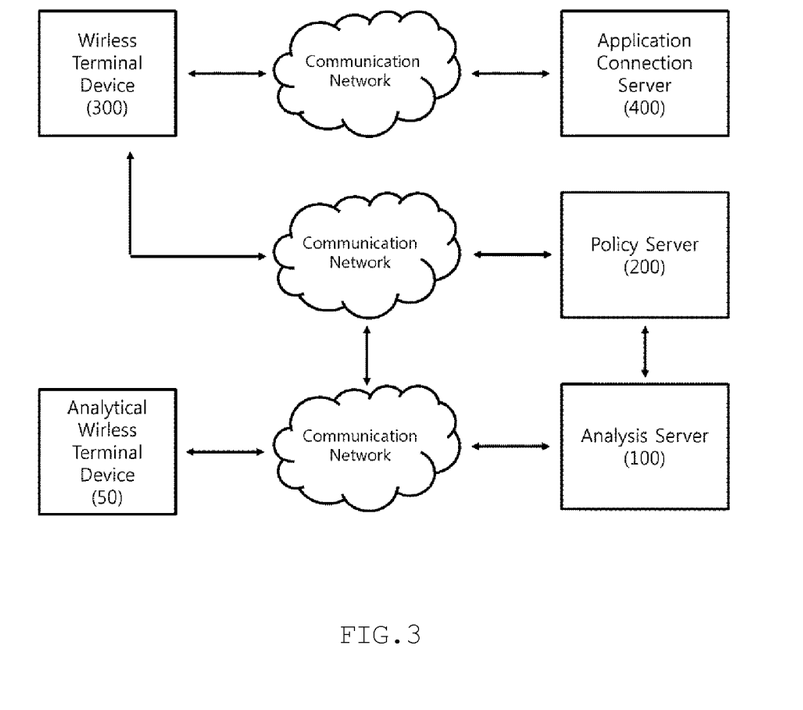
FIG. 3 shows a view illustrating communication network connection according to an embodiment of the present invention.

FIG. 3 shows a view illustrating a communication network or network connection according to an embodiment of the present invention.

More particularly, FIG. 3 is illustrating a structure of a dynamic network pattern analysis system of a mobile application, the system including an analysis server 100. The dynamic network pattern analysis system, connected with an analytical wireless terminal server 50 and/or a user's wireless terminal device 300 over communication network, receives network usage information of an analysis target application by using a detection application included in the analytical wireless terminal server 50 and/or a user's wireless terminal device 300, after accumulatively storing the received network usage information in connection with the analysis target application information in a storage medium 150, and obtaining network usage pattern information of the analysis target application by analyzing the network usage information of each analysis target application accumulatively stored in the storage medium 150. And, the dynamic network pattern analysis system processes to transmit the network usage pattern information of the analysis target application to a policy server 200 over the communication network, or transmit network usage control policy information of the analysis target application to the user's wireless terminal device 300 after generating the network usage control policy information of the analysis target application by using the network usage pattern information of the analysis target application.

The dynamic network pattern analysis system of the mobile application according to an embodiment of the present invention may configure various structures according to the implementation methods and the network connection methods over the communication network.

The analysis sever 100, a core component of the dynamic network pattern analysis system of the mobile application according to the present invention, performs a role of obtaining the network usage pattern information of the analysis target application included in the analytical wireless terminal server 50 and/or a user's wireless terminal device 300. And, the analysis sever 100 performs a role of transmitting the obtained network usage pattern information of the analysis target application to the policy server 200 over the communication network so that the policy server 200 generates the network usage control policy information of each application for reducing network load by using the network usage pattern information of each application. Or, the analysis sever 100 performs a role of directly generating the network usage control policy information of each application by using the obtained network usage pattern information of the analysis target application and transmitting the generated network usage control policy information to the user's wireless terminal device 300.

The analytical wireless terminal server 50 and/or a user's wireless terminal device 300 according to the present invention perform a role of installing a detecting application provided by the analysis server 100, and then transmitting the network usage information of one or more analysis target applications included in the wireless terminal device to the analysis server 100 the using detection application.

According to the present invention, the analytical wireless terminal server 50 and/or a user's wireless terminal device 300 may include all kinds of terminal devices which enable data communication through network, such as smart phones, mobile phones, tablet PCs, telematics, etc.

The policy server 200 performs a role of receiving the network usage pattern information of each application from the analysis server 100, and then generating the network usage control policy information of each application for reducing network load by using the received network usage pattern information of each application. And, the policy server 200 performs a role of transmitting the generated network usage control policy information of each application for reducing network load to the user's wireless terminal device 300.

According to the present invention, the policy server 200 may be included in the analysis server 100, or configured to a separated individual server. And, the policy server 200 may perform only the role of receiving the network usage control policy information of each application for reducing network load from the analysis server 100, and then transmitting information of the application and the network usage control policy information of each application for reducing network load to the user's wireless terminal device 300.

Figure 4:
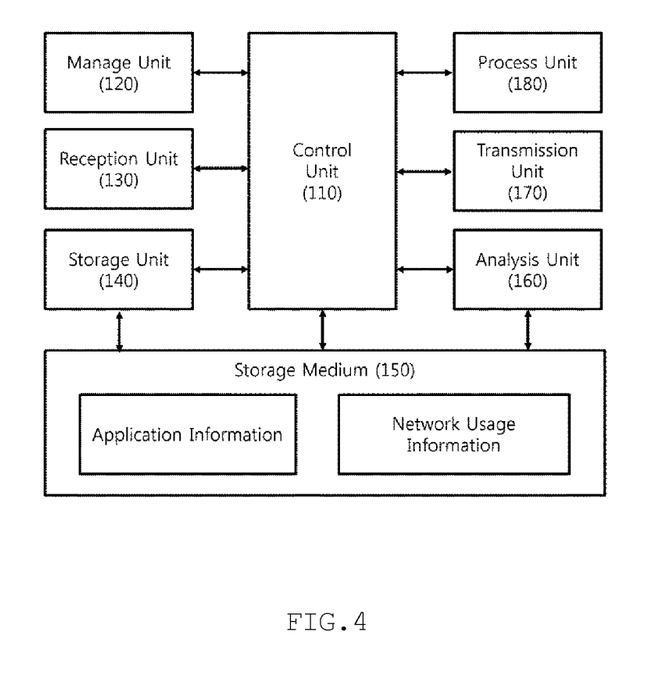
FIG. 4 shows a view illustrating detailed structure of an analysis server according to an embodiment of the present invention.

FIG. 4 shows a view illustrating detailed structure of the analysis server 100 according to an embodiment of the present invention.

More particularly, FIG. 4 shows a detailed structure of the analysis server 100 in the dynamic network pattern analysis system of the mobile application as shown in FIG. 3. Each component of the structure is merely for describing embodiments of the present invention. The technical feature of the present invention is not limited to the embodiments shown in FIG. 4.

Referring to FIG. 4, the analysis server 100 according to the present invention may include a manage unit 120, a reception unit 130, a storage unit 140, a storage medium 150, an analysis unit 160, a transmission unit 170, process unit 180, and a control unit 110 which may control each of the components described above.

Here, though the analysis server 100 is shown as a single server in the drawing for a description of an example, may be composed of one or more separated servers for the each mean or component.

Referring to FIG. 4, the manage unit 120 manages the detecting application installed in the analytical wireless terminal server 50 and/or a user's wireless terminal device 300.

According to the present invention, the manage unit 120 may process installing the detecting application in the analytical wireless terminal server 50 and/or a user's wireless terminal device 300 via an application distribution sever such as the Appstore, the detecting application detecting network usage of one or more analysis target applications included in the analytical wireless terminal server 50 and/or a user's wireless terminal device 300, and furthermore upgrading a policy for detecting and reception of the network usage information by the detection application.

The reception unit 130 according to the present invention received the network usage information of the analysis target application included in the analytical wireless terminal server 50 and/or a user's wireless terminal device 300 using the detecting application managed by the manage unit 120).

The storage unit 140 accumulatively stores the network usage information received by the reception unit 130 in the storage medium 150, in connection with information of the analysis target application.

According to the present invention, if the reception unit 130 receives the network usage information of the analysis target application, the storage unit 140 checks the analysis target application in response to the received network usage information, and accumulates the network usage information pre-stored in the storage medium 150 in response to the checked analysis target application.

The storage medium 150 according to the present invention performs a role of accumulatively storing information of one or more analysis target applications and the corresponding network usage information, the information stored by the storage unit 140.

According to the present invention, the storage medium 150 may be included in the analysis server 100 or a separate server over the communication network.

Also, the storage medium 150 further stores the network usage control policy information of each analysis target application that the analysis server 100 directly generates using the network usage information of each analysis target application.

The analysis unit 160 according to the present invention performs a role of obtaining network usage pattern information of each analysis target application by analyzing the network usage information of each analysis target application that is accumulatively stored in the storage medium 150.

According to the present invention, the network usage pattern information obtained by the analysis unit 160 may include at least one of:

information on number of connections to a certain IP or Port or URL per hour by the analysis target application, information on number of pollings requesting data to a certain IP or Port or URL by the analysis target application, information on number of pushes transmitting data to a certain IP or Port or URL or ID by the analysis target application, information on size or capacity of data transmitted to a certain IP or Port or URL or ID by the analysis target application, information on request and reception of user unauthorized target data including commercial data by the analysis target application, in case a limit allocated to the wireless terminal device is exceeded by the analysis target application, information on connection of data communication, and in case a communication network overload is set in a region where the wireless terminal device is located, information on connection of data communication by the analysis target application.

Figure 5:
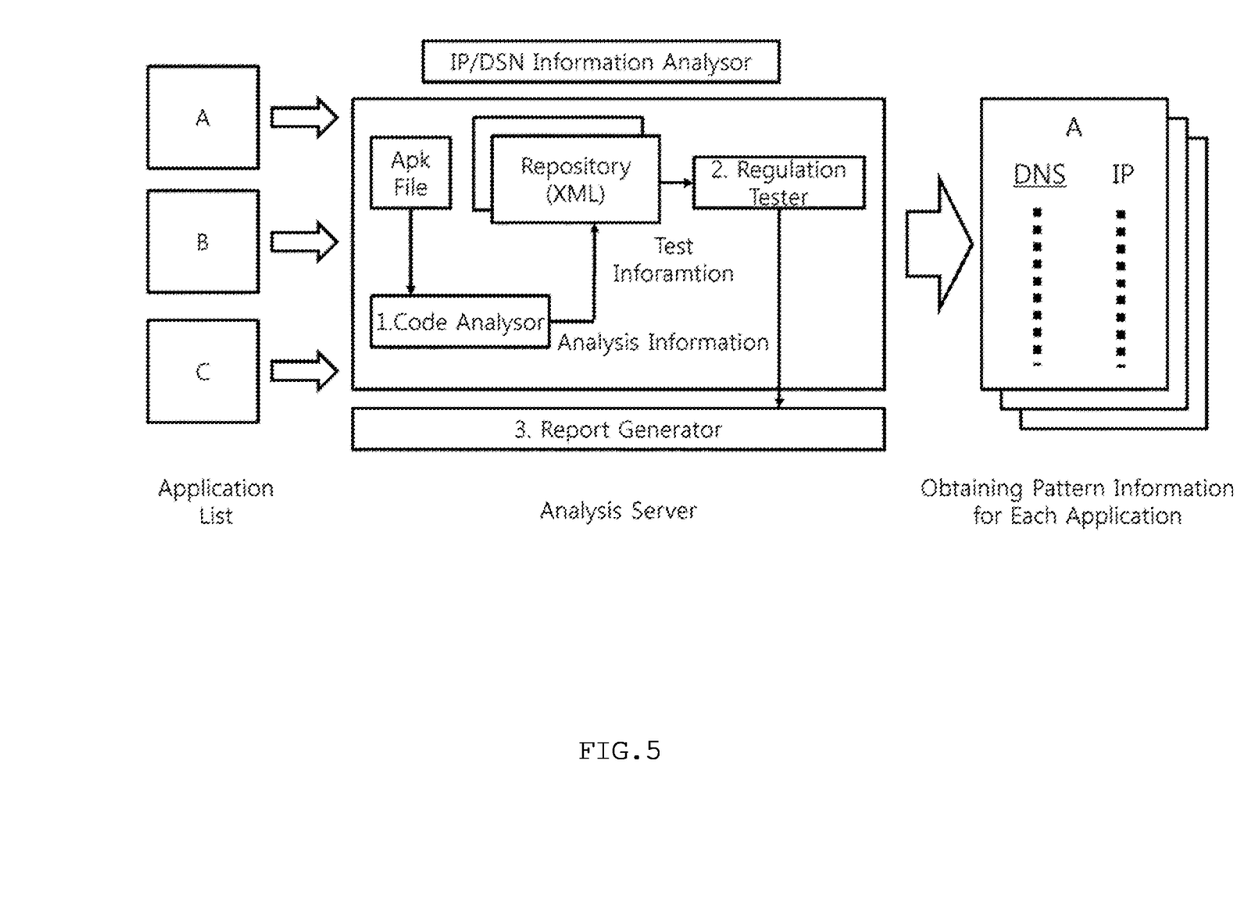
FIG. 5 shows a view illustrating examples of obtaining pattern information for each application of the wireless terminal device by the analysis server according to an embodiment of the present invention.
Figure 6:
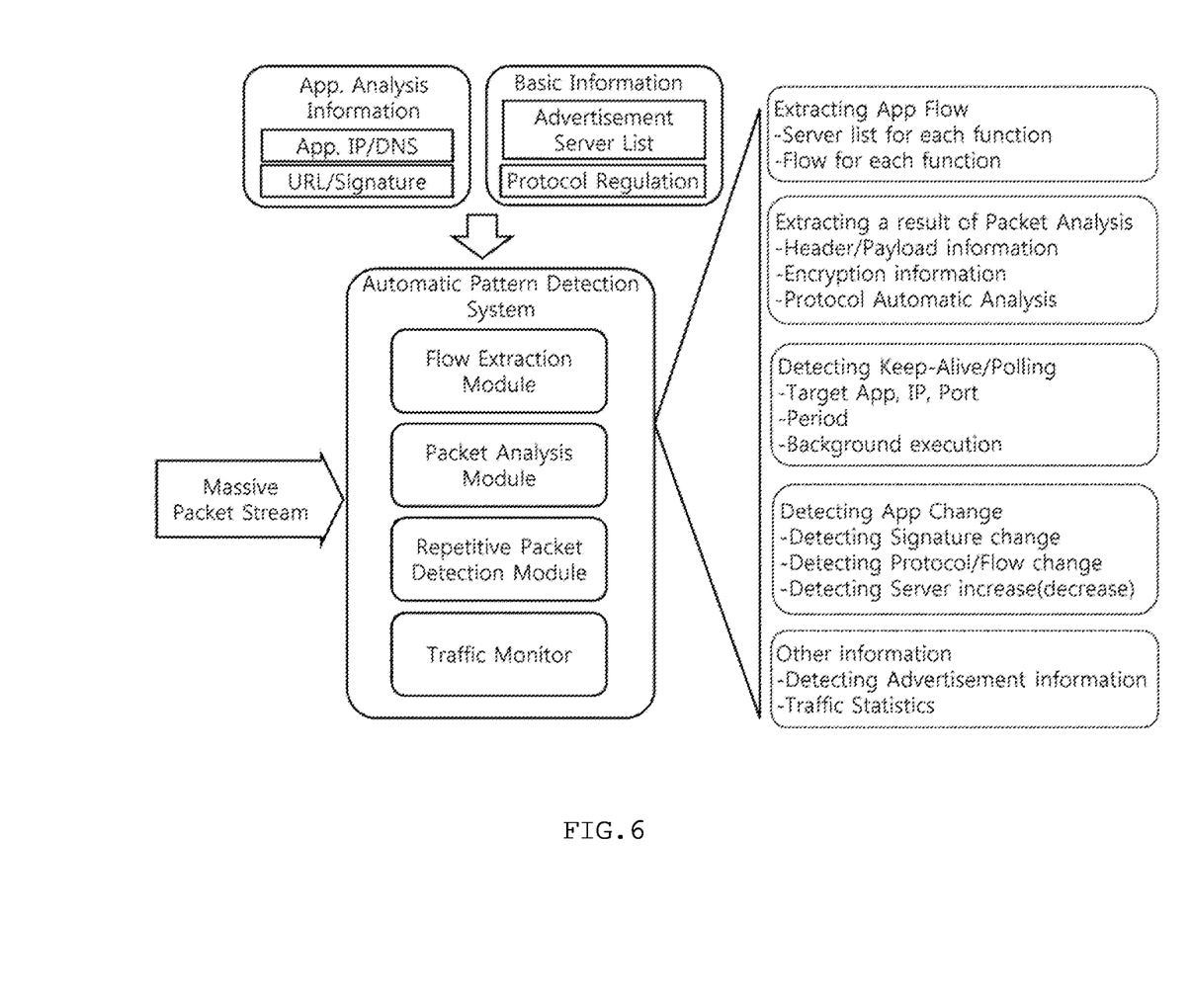
FIG. 6 shows a view illustrating examples of the pattern information for each application of the wireless terminal device by the analysis server according to an embodiment of the present invention.

FIG. 5 and FIG. 6 show a schematic diagram and examples of obtaining the network usage pattern information for each analysis target application by the analysis server 100.

According to the present invention, as shown in FIG. 5, the analysis unit 160 pattern information of each application by analyzing a unique code of each application, the unique code being analysis target application information stored in the storage medium 150, and network usage regulation of each application.

According to an embodiment of the present invention, the analysis unit 160, by using at least one of the flow extraction module, the packet analysis module, the repetitive packet detection module and the traffic monitor, etc., extracts a list of access servers and flow for each function of the analysis target application, extracts packet header/Payload information/encryption information, automatically analyzes a protocol, obtains information of the period of Keep-Alive or data polling, run in background or not, access server IP and Port for each analysis target application, detects the application's changed state—Signature, the protocol and increase/decrease of a server, etc.—, and obtains the network usage pattern information of each analysis target application by analyzing at least one of advertising data detection and traffic statistics.

The transmission unit 170 according to an embodiment of the present invention performs a role of transmitting the network usage pattern information of each analysis target application, the network usage pattern information obtained by the analysis unit 160, to the policy server 200 over the communication network.

That is, the transmission unit 170 enables the policy server 200 to establish the network usage control policy for each application by transmitting the network usage pattern information of each analysis target application to the policy server 200 that establishes the network usage control policy for each application included in the user's wireless terminal device 300 using the network usage pattern information of each analysis target application.

The process unit 180 according to an embodiment of the present invention performs a role of directly generating the network usage control policy for the analysis target application using the network usage pattern information of the analysis target application, the network usage pattern information obtained by the analysis unit 160.

According to the present invention, the process unit 180 checks using the network usage pattern information of the analysis target application, and then generates the network usage control policy information according to each pattern.

The network usage pattern information includes at least one of:

information on number of connections to a certain IP or Port or URL per hour by the analysis target application, information on number of pollings requesting data to a certain IP or Port or URL by the analysis target application, information on number of pushes transmitting data to a certain IP or Port or URL or ID by the analysis target application, information on size or capacity of data transmitted to a certain IP or Port or URL or ID by the analysis target application, information on request and reception of user unauthorized target data including commercial data by the analysis target application, in case a limit allocated to the wireless terminal device is exceeded by the analysis target application, information on connection of data communication, and in case a communication network overload is set in a region where the wireless terminal device is located, information on connection of data communication by the analysis target application.

And, the network usage control policy information includes at least one of:

policy information for adjusting number of connections to a certain IP or Port or URL per hour;

policy information for adjusting number of pollings requesting data to a certain IP or Port or URL;

policy information for adjusting number of pushes transmitting data to a certain IP or Port or URL or ID;

policy information for adjusting size or capacity of data transmitted to a certain IP or Port or URL or ID;

policy information for blocking request and reception of user unauthorized target data including commercial data;

policy information, in case a limit allocated to the wireless terminal unit is exceeded, for blocking connection of data communication; and policy information, in case a communication network overload is set in a region where the wireless terminal device is located, for blocking connection of data communication.

An embodiment of the policy information generated by the process unit 180 according to the present invention is as in the following.

```
<?xml version "1.0" encoding="UTF-8"?>
<policy>
<description> Rules for block app </description>
<rule>
<rule_id> T_2012_B_02_103030_P2 </rule_id>
<rule_act> B_03_P_01 </rule_act>
<app_id> T_2012_A_08_2089_K2_09_3092 </app_id>
<target_ip> 192.168.0.255 </target_ip>
<port> 80 </port>
<refresh> 30 sec </refresh>
</rule>
<sign>e5c6e5ccec361baebcf79859e49c5526</sign>
</policy>
```

In the above example of policy, "<rule_id> T_2012_B_02_103030_P2</rule_id>" defines the policy value, which indicates that the policy is application network blocking policy (B02) in the year 2012, and the policy administrator's authority is 103030, and the priority for applying the policy is P2 level.

Here, "<rule_id> T_2012_B_02_103030_P2</rule_id>" may be replaced by "<rule_id> T_2012_P02_103030P2</rule_id>" used for application network polling policy (P02) in the year 2012, or may be used for application network loopback policy (L05) in the year 2012, or may be replaced by "<rule_id>T_2012 L_05_103030P3</rule_id>" which indicates that the policy administrator's authority is 103030 and the priority for applying the policy is P3 level.

In addition, "<rule_act>B_03_P_01</rule_act>" is indicating that the performing method for applying the policy is "apply immediately". And, "<app_id>T_2012_A_08_2089_K2_09_3092</app_id>" means that the policy applicable application ID is from "A_08_2089_K2" to "09_3092" and a mask value of the policy applicable application is K2.

And, "<sign>e5c6e5 ccec361baebcf79859e49c5526</sign>" is a value for integrity verification of the policy information in order to check if the policy document is tampered while coming through the network. "<target_ip> 192.168.0.255</target_ip>", and "<port>80</port>" indicate that the target IP address for blocking (functions such as loopback) is 192.168.0.255, and the target port is 80, respectively.

In addition, "<refresh> 30 sec </refresh>" means that refresh timeout is set to 30 sec. In this case, proxy/cache server will be used for the corresponding packet, and at this time, it means that the request packet transmitted from the wireless terminal device 100 to the network will be forwarded to the proxy/cache server every 30 seconds.

In this case, for transmitting the packet from user's wireless terminal device 100, methods such as forwarding, registering the corresponding bypass information in DNS server, or dynamically/statically changing a routing table for the certain IP address may be used. Unconditional forwarding (bypass) method using the wireless terminal device 100 of user may be used for blacklisting policy for chronic malignant service/packet.

The above described policy information is merely an embodiment, may be various according to characteristics or type of the policy.

According to the present invention, the process unit 180 may further perform a role of transmitting the generated network usage control policy information an application for reducing network load (that is, an application for executing the network usage control policy) included in the user's wireless terminal device 300 via the communication network.

According to an embodiment of the present invention, one of the transmission unit 170 and the process unit 180 may be omitted.

According to the present invention, a whole or a part of the functions of each component included in the analysis server 100 may be implemented in a program or program set.

Figure 7:
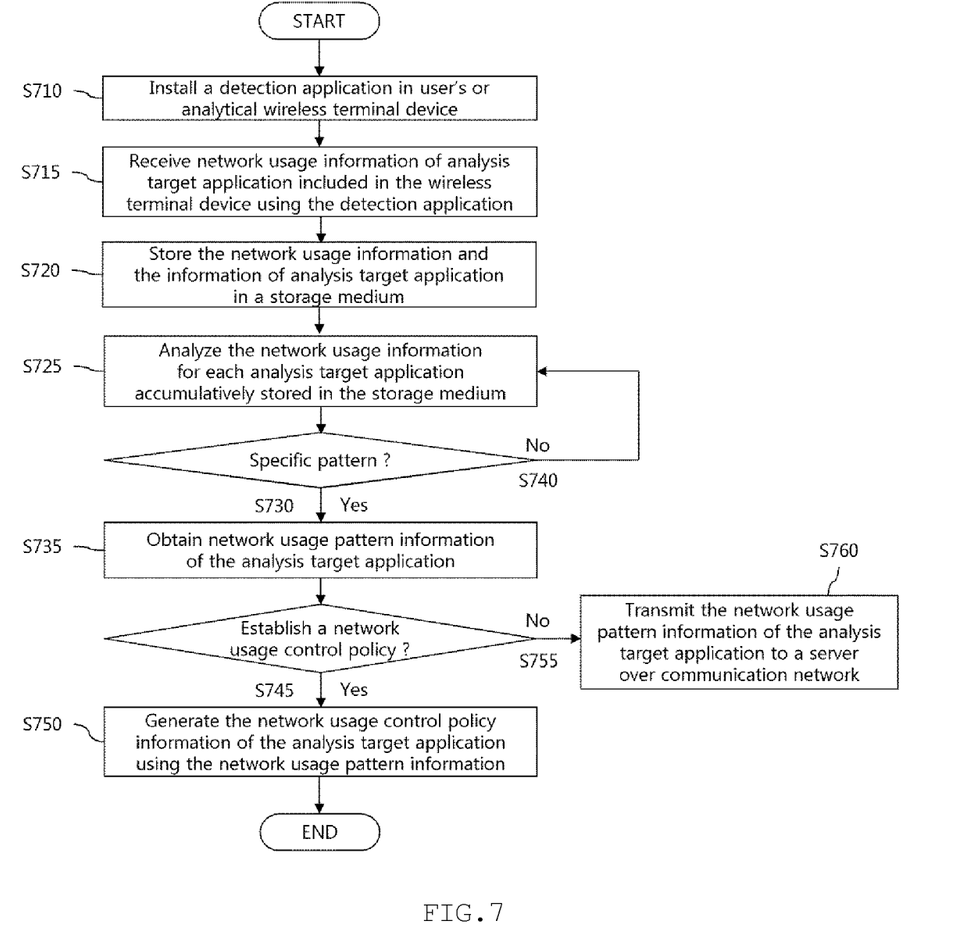
FIG. 7 shows a flow chart illustrating a process of obtaining the pattern information by the analysis server according to an embodiment of the present invention.

FIG. 7 shows a view illustrating a process for obtaining the pattern information by the analysis server 100 according to an embodiment of the present invention.

At first, the analysis server 100 installs the detecting application in the analytical wireless terminal server 50 and/or a user's wireless terminal device 300 via an application distribution sever such as the Appstore using the manage unit 120, the detecting application detecting the network usage of one or more analysis target applications included in the analytical wireless terminal server 50 and/or a user's wireless terminal device 300 (S710).

Afterwards, the analysis server 100 receives the network usage information of the analysis target application included in the analytical wireless terminal server 50 and/or a user's wireless terminal device 300 from the detection application, through the reception unit 130 (S715).

Afterwards, the analysis server 100 accumulatively stores the network usage information of the analysis target application received by the reception unit 130, in connection with the analysis target application information, in the storage medium 150, through the storage unit 140 (S720).

Afterwards, the analysis server 100 analyzes the network usage information for each analysis target application, the network usage information accumulatively stored in the storage medium 150, through the analysis unit 160 (S725).

In case a specific pattern is checked in the network usage information accumulatively stored in the storage medium 150 (S730), the analysis server 100 obtains the network usage pattern information of each analysis target application by using the specific pattern check by the analysis unit 160 (S735).

If a specific pattern is not checked in the network usage information accumulatively stored in the storage medium 150 (S740), the analysis server 100 repeats the analyzing of the network usage information accumulatively stored in the storage medium 150.

If the network usage pattern information of each analysis target application is obtained in the step of S735, the analysis server 100 determines whether of establishing a network usage control policy or not. In case the analysis server 100 directly establishes the network usage control policy (S745), the analysis server 100 directly generates the network usage control policy information of the analysis target application by using the network usage pattern information of the analysis target application obtained by analysis unit 160, through the process unit 180 (S750).

Though not shown separately in the drawing, after the step of S750, the analysis server 100 may transmit the generated network usage control policy information to the application for reducing network load (that is, an application for executing the network usage control policy) included in the user's wireless terminal device 300 via the communication network.

In case the analysis server 100 doesn't directly establishes the network usage control policy (S755), the analysis server 100 enables the policy server 200 to establish the network usage control policy of each application by transmitting the network usage pattern information of each analysis target application to the policy server 200 that establishes the network usage control policy of each application included in the wireless terminal device 300 through the transmission unit 170 (S760).

In addition, the above-described present invention may be implemented as a program executable in a computer and may be stored in a computer-readable recording medium; examples of the computer-readable recording medium may be ROM, RAM, CD-ROM, Magnetic Tape, Floppy Disk, Optical Data Storage, etc., including carrier wave (e.g., transmission through internet).

The computer-readable recording medium may be distributed to a computer systems connected in a network, so that the computer-readable code may be stored and executed in a distributed mode. Also, functional program, code and code segments for implementing the controlling method may be inferred easily by programmers who skilled in the art of the present invention.

In the above, preferred embodiments of the present invention have been described. However, these embodiments are merely examples and do not limit the present invention, so that persons who skilled in the art of the present invention may easily transform and modify within the limit of the technical spirit of the present invention. For example, each of the components shown in detail in the embodiments of the present invention may be implemented in transformation. In addition, the differences relating these transformations and modifications shall be regarded to be included in the scope of the present invention as defined in the attached claims of the present invention.

What is claimed is:

1. A system for analyzing network usage pattern, the system being connected to a wireless terminal device using a communication network, comprising:
 a reception unit for receiving network usage information of an analysis target application included in the wireless terminal device;
 a storage unit for accumulatively storing the network usage information received by the reception unit, in connection with information of the analysis target application, in a storage medium; and
 an analysis unit for obtaining network usage pattern information of the analysis target application by analyzing the network usage information accumulatively stored in the storage medium.

2. The system for analyzing network usage pattern according to claim 1, wherein the network usage information is detected by a detection application included in the wireless terminal device.

3. The system for analyzing network usage pattern according to claim 2, further comprising:
 a manage unit for managing the detecting application included in the wireless terminal device.

4. The system for analyzing network usage pattern according to claim 3, wherein the manage unit manages the detecting application to be installed in the wireless terminal device, or upgrades a policy for detecting or receiving the network usage information in the detection application.

5. The system for analyzing network usage pattern according to claim 1, further comprising:
 a transmission unit for transmitting the obtained network usage pattern information of the analysis target application to a server over a communication network.

6. The system for analyzing network usage pattern according to claim 1, wherein the analysis unit analyzes the network usage information by using at least one of a flow extraction module, a packet analysis module, a repetitive packet detection module and a traffic monitor.

7. The system for analyzing network usage pattern according to claim 1, wherein the analysis unit obtains a list of access servers or flows for each function of the analysis target application by analyzing the network usage information.

8. The system for analyzing network usage pattern according to claim 1, wherein the analysis unit obtains at least one of a period of keep-alive or pollings, whether operating in background or not, address information of an access server and whether including commercial data or not for the analysis target application.

9. The system for analyzing network usage pattern according to claim 1, wherein the network usage pattern information includes information of at least one of number of connections per hour, number of pollings requesting data, number of pushes transmitting data and size or capacity of data transmitted to a certain IP or URL by the analysis target application.

10. The system for analyzing network usage pattern according to claim 1, wherein the network usage pattern information includes information of whether the analysis target application requests or receives unauthorized data including commercial data.

11. The system for analyzing network usage pattern according to claim 1, wherein the network usage pattern information includes information of whether the analysis target application connects a data communication in case a data communication limit allocated to the wireless terminal device is exceeded or a communication network overload occurs in a region where the wireless terminal device is located.

12. The system for analyzing network usage pattern according to claim 1, further comprising:
 a process unit for generating network usage control policy information for the analysis target application by using the obtained network usage pattern information, wherein the generated network usage control policy information is transmitted to the wireless terminal device.

13. The system for analyzing network usage pattern according to claim 12, wherein the network usage control policy information is information for controlling keep-alive or polling signals periodically transmitted by an application in background.

14. The system for analyzing network usage pattern according to claim 12, wherein the network usage control policy information includes information for adjusting at least one of number of connections, number of pollings requesting data, number of pushes transmitting data and size or capacity of data transmitted to a certain IP or URL.

15. The system for analyzing network usage pattern according to claim 12, wherein the network usage control policy information includes information for blocking request and reception of unauthorized data including commercial data.

16. The system for analyzing network usage pattern according to claim 12, wherein the network usage control policy information includes information for blocking connection of data communication in case a data communication limit allocated to the wireless terminal device is exceeded or a communication network overload occurs in a region where the wireless terminal device is located.

17. A method for analyzing network usage pattern in a system connected to a wireless terminal device using a communication network, comprising:
    receiving network usage information of an analysis target application included in the wireless terminal device;
    accumulatively storing the network usage information received by the reception unit, in connection with information of the analysis target application, in a storage medium; and
    obtaining network usage pattern information of the analysis target application by analyzing the network usage information accumulatively stored in the storage medium.

18. The method for analyzing network usage pattern according to claim 17, further comprising:
    managing a detection application included in the wireless terminal device for detecting the network usage information.

19. The method for analyzing network usage pattern according to claim 17, further comprising:
    generating network usage control policy information for the analysis target application by using the obtained network usage pattern information; and
    transmitting the generated network usage control policy information to the wireless terminal device.

20. A computer-readable recording medium for recording programs to execute the method of claim 17.

* * * * *